United States Patent
Graf et al.

(10) Patent No.: US 10,146,424 B2
(45) Date of Patent: Dec. 4, 2018

(54) DISPLAY OF OBJECTS ON A TOUCH SCREEN AND THEIR SELECTION

(71) Applicant: Dell Products, LP, Round Rock, TX (US)

(72) Inventors: Knut Graf, Austin, TX (US); Deeder M. Aurongzeb, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 121 days.

(21) Appl. No.: 14/193,447

(22) Filed: Feb. 28, 2014

(65) Prior Publication Data
US 2015/0248215 A1    Sep. 3, 2015

(51) Int. Cl.
*G06F 3/0481* (2013.01)
*G06F 3/0488* (2013.01)

(52) U.S. Cl.
CPC ........ *G06F 3/0488* (2013.01); *G06F 3/04812* (2013.01); *G06F 2203/04101* (2013.01)

(58) Field of Classification Search
CPC .. G06F 3/04812; G06F 3/0484; G06F 3/0488; G06K 9/2054
USPC ........................................ 715/822, 860, 823
See application file for complete search history.

(56) References Cited

U.S. PATENT DOCUMENTS

| 5,170,348 | A |   | 12/1992 | Hirose |
| 5,929,841 | A | * | 7/1999  | Fujii ..................... G06F 3/0346 345/473 |
| 6,223,294 | B1 |   | 4/2001  | Kondoh |
| 6,567,109 | B1 | * | 5/2003  | Todd .................... G06F 3/04842 715/862 |
| 6,704,034 | B1 | * | 3/2004  | Rodriguez ............ G06F 3/0481 715/764 |
| 7,277,089 | B2 |   | 10/2007 | Keely et al. |
| 7,626,580 | B2 |   | 12/2009 | Keely et al. |

(Continued)

FOREIGN PATENT DOCUMENTS

| CN | 103389873 A | * 11/2013 | ......... G06F 3/04883 |
| JP | 2005-267648 A1 | 9/2005 | |

OTHER PUBLICATIONS

Intensity. (2011). The American Heritage Dictionary of the English language. Boston, MA: Houghton Mifflin. Retrieved from http://search.credoreference.com/content/entry/hmdictenglang/intensity/0 on Sep. 21, 2015. 2 pgs.*

(Continued)

*Primary Examiner* — Steven Sax
(74) *Attorney, Agent, or Firm* — Prol Intellectual Property Law, PLLC; H. Kenneth Prol

(57) ABSTRACT

A touch screen may emphasize the display of objects near the tip of a user input instrument located near the surface of the touch screen but not touching the touch screen. The objects may consist of words and the emphasis may consist of highlighting. The user input instrument may be a finger of a user or an electronic pen. As the user input instrument is moved, the objects emphasized may change. A user may select objects on a touch screen by entering into object-selection mode and moving the user input instrument along the surface of the touch screen. An initial touch of the user input instrument to the surface of the touch screen may select a nearest object or objects. As the user input instrument is moved along the surface, the selection of objects may change based upon the movement.

19 Claims, 9 Drawing Sheets

(56) References Cited

U.S. PATENT DOCUMENTS

| | | | |
|---|---|---|---|
| 7,689,936 B2* | 3/2010 | Rosel | G06F 3/04842 715/822 |
| 8,423,914 B2* | 4/2013 | Louch | G06F 3/0481 715/823 |
| 8,904,309 B1* | 12/2014 | Zhai | G06F 3/0237 715/773 |
| 9,207,848 B2* | 12/2015 | Kobayashi | G06F 1/169 |
| 2002/0080126 A1* | 6/2002 | Keely | G06F 3/04883 345/179 |
| 2005/0097479 A1* | 5/2005 | Takabe | H04N 7/163 715/851 |
| 2005/0198591 A1* | 9/2005 | Jarrett | G06K 9/222 715/863 |
| 2005/0206627 A1 | 9/2005 | Simmons | |
| 2005/0227352 A1* | 10/2005 | Xie | C12N 5/0601 435/348 |
| 2008/0118153 A1* | 5/2008 | Wu | G06K 9/00711 382/190 |
| 2008/0158172 A1* | 7/2008 | Hotelling | G06F 1/3231 345/173 |
| 2008/0174570 A1* | 7/2008 | Jobs | G06F 3/0488 345/173 |
| 2009/0064117 A1* | 3/2009 | Bashkansky | G06F 8/443 717/154 |
| 2010/0185982 A1* | 7/2010 | Brodersen | G06F 3/04817 715/828 |
| 2010/0185989 A1* | 7/2010 | Shiplacoff | G06F 3/0416 715/856 |
| 2010/0190143 A1* | 7/2010 | Gal | G09B 5/00 434/322 |
| 2011/0050575 A1* | 3/2011 | Krahenbuhl | G06F 3/0236 345/168 |
| 2011/0213655 A1* | 9/2011 | Henkin | G06Q 30/00 705/14.49 |
| 2012/0023447 A1* | 1/2012 | Hoshino | G06F 17/2735 715/823 |
| 2013/0054613 A1* | 2/2013 | Bishop | G06F 17/30011 707/748 |
| 2014/0181714 A1* | 6/2014 | Anderson | G06F 3/04817 715/769 |
| 2014/0340407 A1* | 11/2014 | Perez | G06T 11/206 345/440.2 |
| 2015/0052471 A1* | 2/2015 | Chen | A61B 6/025 715/771 |
| 2015/0332107 A1* | 11/2015 | Paniaras | G06F 3/016 715/765 |

OTHER PUBLICATIONS

Intensity, Subset (2001). Chambers 21st Century Dictionary. London, United Kingdom: Chambers Harrap. Retrieved from http://search.credoreference.com/content/entry/chambdict/intensity/0 .../subset/0 0 on Sep. 21, 2015. 4 pgs.*

* cited by examiner

DISPLAY OF OBJECTS ON A TOUCH SCREEN AND THEIR SELECTION

FIELD OF THE DISCLOSURE

The present disclosure generally relates to information handling systems, and more particularly relates to selecting and displaying objects on a touch screen.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. The hardware resources may include touch screens.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
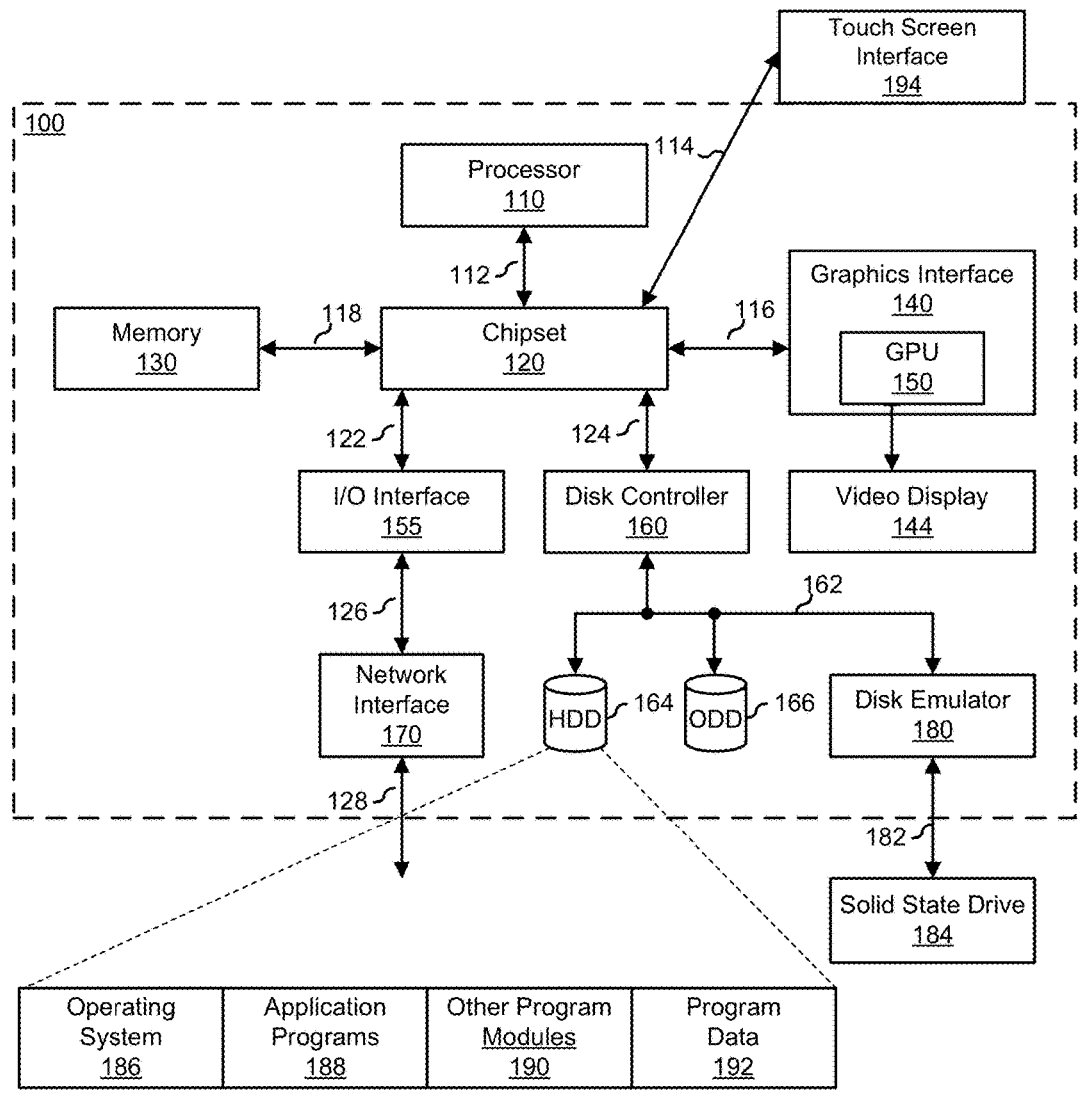
FIG. 1 is a block diagram illustrating an information handling system according to an embodiment of the present disclosure.

FIG. 1 illustrates a block diagram of an exemplary embodiment of an information handling system, generally designated at 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. Information handling systems may include processing resources, such as a central processing unit (CPU) or hardware or software control logic, and may operate to execute code.

The information handling system 100 can include a physical processor 110 coupled to chipset 120 via host bus 112. Physical processor 110 may operate to execute code. Other embodiments may include additional processors coupled to a chipset. In further embodiments, each processor may be connected to the chipset via a separate host bus. In these embodiments, the chipset may support multiple processors and can allow for simultaneous processing of multiple processors and support the exchange of information within an information handling system during multiple processing operations. In other embodiments, processing resources of an information handling system may include hardware or software control logic.

According to one aspect, the chipset 120 can be referred to as a memory hub or a memory controller. For example, the chipset 120 can include an Accelerated Hub Architecture (AHA) and can include a memory controller hub and an input/output (I/O) controller hub. As a memory controller hub, the chipset 120 can function to provide access to physical processor 110 using the host bus. The chipset 120 can also provide a memory interface for accessing memory 130 using memory bus 118. In a particular embodiment, the memory bus 118 and the host bus 112 can be individual buses or part of the same bus. The chipset 120 can also provide bus control and can handle transfers between the buses when there are multiple buses.

According to another aspect, the chipset 120 can be generally considered an application specific chipset that provides connectivity to various buses, and integrates other system functions. For example, the chipset 120 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 120. The chipset 120 can also be packaged as an application specific integrated circuit (ASIC).

The information handling system 100 can also include a graphics interface 140 that can be coupled to the chipset 120 using bus 116. In one form, the graphics interface 140 can be a Peripheral Component Interconnect (PCI) Express interface to display content within a video display 144. Other graphics interfaces may also be used. The graphics interface 140 can provide a video display output to the video display 144. The video display 144 can include one or more types of video displays such as a flat panel display (FPD) or other type of display device. In some embodiments, information handling system 100 may be a video game controller and video display 144 may be a television console.

The information handling system 100 can also include an I/O interface 155 that can be connected via I/O bus 122 to the chipset 120. The I/O interface 155 and I/O bus 122 can include industry standard buses or proprietary buses and respective interfaces or controllers. For example, the I/O bus can also include a PCI bus or a high speed PCI-Express bus. PCI buses and PCI-Express buses can be provided to comply with industry standards for connecting and communicating between various PCI-enabled hardware devices. Other buses can also be provided in association with, or independent of, I/O bus 122 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 120 can be a chipset employing a Northbridge/Southbridge chipset configuration (not illustrated). For example, a Northbridge portion of the chipset 120 can communicate with the processor 110 and can control interaction with the memory 130, the I/O bus that can be operable as a PCI bus, and activities for the graphics interface 140. In many embodiments, graphics interface 140 may be a separate graphics card. Graphics interface 140 includes graphics processing unit 150. The Northbridge portion can also communicate with the processor 110 using the host bus. The chipset 120 can also include a Southbridge portion (not illustrated) of the chipset 120 and can handle I/O functions of the chipset 120. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a network interface 170 connected to I/O interface 155 via bus 126. In a particular embodiment, bus 126 and I/O bus 122 can be individual buses or part of the same bus. The network interface 170 can provide connectivity to a network 128, e.g., a wide area network (WAN), a local area network (LAN), wireless network (IEEE 802), or other network. The network interface 170 may also interface with macrocellular networks including wireless telecommunications networks such as those characterized as 2G, 3G, or 4G or similar wireless telecommunications networks similar to those described above. The network interface 170 may be a wireless adapter having antenna systems for various wireless connectivity and radio frequency subsystems for signal reception, transmission, or related processing.

The information handling system 100 can further include a disk controller 160 connected to chipset 120 via bus 124. In a particular embodiment, bus 124 and host bus 112 can be individual buses or part of the same bus. Disk controller 160 can include a disk interface 162 that connects disc controller 160 to one or more internal disk drives such as a hard disk drive (HDD) 164 and an optical disk drive (ODD) 166 such as a Read/Write Compact Disk (R/W CD), a Read/Write Digital Video Disk (R/W DVD), a Read/Write mini-Digital Video Disk (R/W mini-DVD), or other type of optical disk drive. Disk controller 160 is also connected to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be coupled to information handling system 100 via an external interface 182. An example of external interface 182 includes a USB interface, an IEEE 1394 (Firewire) interface, a proprietary interface, or a combination thereof. Alternatively, solid-state drive 184 can be disposed within information handling system 100.

The disk drive units 164 and 166 and solid state drive 184 may include a computer-readable medium in which one or more sets of instructions such as software can be embedded. Further, the instructions may embody one or more of the methods or logic as described herein. In a particular embodiment, the instructions may reside completely, or at least partially, within memory 130 and/or within processor 110 during execution by the information handling system 100. Memory 130 and processor 110 also may include computer-readable media. In the embodiment of FIG. 1, disk drive unit 164 contains operating system 186, application programs 188, other program modules 190, and program data 192.

Information handling system 100 also includes touch screen interface 194 connected to chipset 120 via a bus 114. Touch screen interface 194 may provide a touch interface to users. A touch screen may consist of a surface that reacts to the touch of a user, enabling the user to enter input. The touch may be performed by a finger of the user or by a variety of pen-shaped instruments, such as a stylus and an active pen. These instruments will be referred to as user input instruments. Some embodiments of a touch screen may also recognize and react to a user input instrument placed near the surface of the touch screen. The touch screen also serves as a display. In other embodiments, a touch screen interface may be directly connected to a processing unit. In addition, a touch screen interface may be connected to a processing unit via a serial port, parallel port or other interface as known in the art.

Application programs 188 may generate displays on a touch screen and touch screen interface 194 may enable a user to interact with the application programs 188. Data used to produce the displays may be stored in program data 192. The displays may include objects—programming constructs that enable user interaction and that possess properties in addition to pure display properties. Thus, pure bit map regions are not objects. Programs that process text, such as word processing programs and spread sheets, may create words as objects. A user may interact with these objects in order to change the size or type of font, correct typographical errors, change the capitalization, and other features. A spread sheet program may also create cells as objects. Programs may create other graphical images that a user may interact with by selecting through touch screen interface 194. A map program may generate multiple vector objects for display in a map image. The map program may, for instance, generate vector objects to represent buildings, businesses, intersections, or other portions of a region. The user may be able to determine properties of the represented objects by interacting with the graphical images of the objects on a map. By manipulating an object of the program, a user may determine directions to the object or other information about the portion of the region represented, such as contact information, business hours, or business name. Similarly, a drawing program may generate objects that a user may manipulate by changing the size, line thickness, location, or other properties. The objects created by drawing programs and other programs creating images may include vector objects, such as lines, polygons, and Bezier curves.

The objects generated by application programs 188 may have a granularity larger than the pixel level of images produced by the programs. As a result, portions of an object may not themselves be objects and possess the properties of objects. Thus, in a drawing program, for example, properties such as the weight or pattern of a line apply only to objects, and not to portions of an object that are not themselves objects.

A controller may mediate between the program and the touch screen to control the display of objects created by the program. In the case of a text processing program, for example, the controller may be a standard controller for the display of text. Many text controllers may implement the display of text in accordance with rich text format (RTF) characteristics. Given a command to display text with specified RTF characteristics, such as a font size and font color, the text controller may generate the proper text display on the touch screen.

In the embodiment of FIG. 1, holding a user input instrument near the touch screen may cause an emphasis of the display of objects near the user input instrument. In some embodiments, objects nearer the user input instrument may be displayed with a greater emphasis than objects further from the user input instrument. Further, the user may be able to select objects by touching the user input instrument to the touch screen and dragging the user input instrument along the surface of the screen. In response to this motion, the application program generating the objects may select the objects. Emphasizing an object shall mean emphasizing a display of the object.

Figure 2:
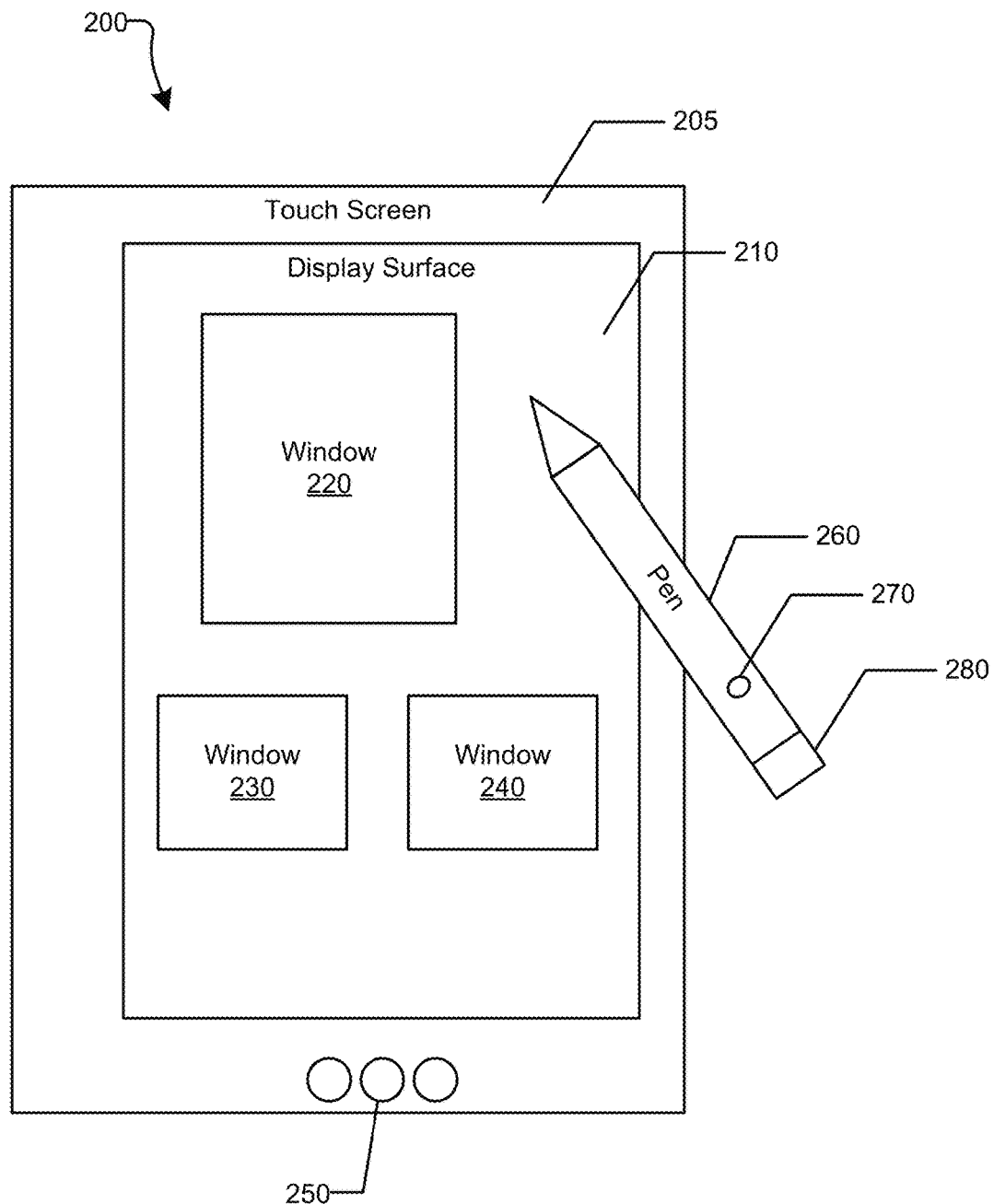
FIG. 2 is a block diagram of a touch screen apparatus according to an embodiment of the present disclosure.

FIG. 2 shows touch screen apparatus 200. Touch screen apparatus 200 includes touch screen 205 and pen 260. Touch screen 205 includes display surface 210 and controls 250. Display surface 210 includes windows 220, 230, and 240. The displays on windows 220, 230, and 240 may be produced by application programs such as application programs 188 of FIG. 1. The displays may include the display of objects. A user may be able to interact with the objects by entering input into touch screen 205 through pen 260. Controls 250 may control the operation of touch screen 205. In one embodiment, for example, depressing a button may shift touch screen 205 to object recognition mode. In this mode, touch screen 205 may recognize objects when pen 260 is in close proximity to them and may highlight or otherwise emphasize the objects.

Touch screens such as touch screen 205 may include resistive touch screens, capacitive touch screens, Digitizer tablets, surface acoustic wave touch screens, infrared grid touch screens, infrared acrylic projection touch screens, optical imaging touch screens, dispersive signal technology touch screens, acoustic pulse recognition touch screens, and other touch screens known to those of skill in the art. Resistive touch screen detect touch or pressure. They may consist of multiple conductive layers. In response to pressure or touch, the layers may touch, creating an electrical connection. Capacitive touch screens may detect a change in electrical conductivity caused by the touch of a finger or other user input instrument. Digitizer tablets, also known as active digitizers, may locate a user input instrument by detecting electrical signals. Some require an active pen, which generates the electrical signals. Others generate an electrical field and may be able to detect the motion of a user input instrument within the electrical field. Some of these tablets may be able to detect the motion of a finger near the touch screen but not touching the touch screen.

An infrared grid recognizes a location of a touch by a disruption to a grid of light emitting diode (LED) beams. It uses an array of infrared LED and photo detector pairs. An infrared acrylic projection touch screen uses infrared cameras to detect distortions in a translucent acrylic sheet. Optical touchscreens use image sensors are placed around the edges of the screen. Infrared back lights are placed in the camera's field of view on the other side of the screen. A touch shows up as a shadow and each pair of cameras can then be pinpointed to locate the touch or even measure the size of the touching object. Dispersive signal technology touch screens use sensors to detect the piezoelectricity in the glass that occurs due to a touch. Algorithms then interpret this information to determine the location of the touch. Acoustic pulse recognition touch screens detect the sound waves produced by touches to determine the location of the touches.

Digital pen 260 includes controls 270 and 280. In some embodiments, control 280 may act as an eraser. By adjusting control 270, a user may be able to change the interaction of digital pen with touch screen 205. When control 270 is a button, for example, the user may depress it to change a mode of operation of touch screen 205. In general, digital pens, such as digital pen 260, may contain internal electronics, and may possess features such as touch sensitivity, input buttons, memory, writing data transmission capabilities, and electronic erasers. Active pens may send signals to touch screens, thus locating them spatially. These signals may provide an accurate location of the active pen even when the pen is lifted above the surface of the tablet. Passive digitizer pens do not emit signals, but provide a similar function using signals put out by the surface of the tablet itself. User input instruments may also include styluses. They may not contain specialized circuitry, but instead may act as a source of pressure, or, in the case of capacitive touch screens, conductivity.

In many embodiments, an object other than a pen or a stylus may provide user input to a touch screen. A finger, a pencil, an ordinary writing pen, or other pointed instrument may, for example, be used with some touch screens.

In many embodiments, a touch screen may recognize a pen or other user input instrument located near the touch screen but not touching the surface of the touch screen. In this case, the user input instrument is said to be hovering. Hover technologies may include the electrical signal generation of the pen or touch screen described above, the use of cameras, capacitive sensors, and other technologies known to those of skill in the art. A hovering user input instrument may be recognized by the analysis of images captured by one or more cameras from reflections of LED beams projected near the front of a touch screen. Capacitive sensors may combine mutual capacitance and self capacitance to detect a user input instrument hovering above the surface of a touch screen. In some embodiments, a combination of technologies may be used to detect user input instruments hovering over touch screens, such as a combination of image capture and capacitance. A hover-sensing device is a device able to detect a user input instrument hovering above or nearby the surface of a touch screen. In many embodiments, the hover-sensing device is a component of the touch screen.

Figure 3A:
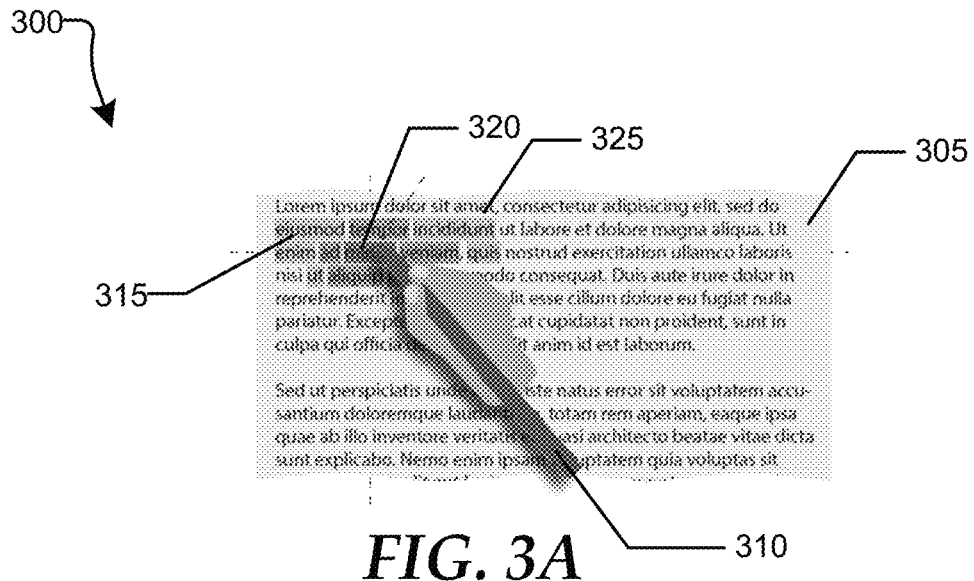
FIGS. 3A and 3B are illustrations of a display of objects on a touch screen according to an embodiment of the present disclosure.
Figure 3B:
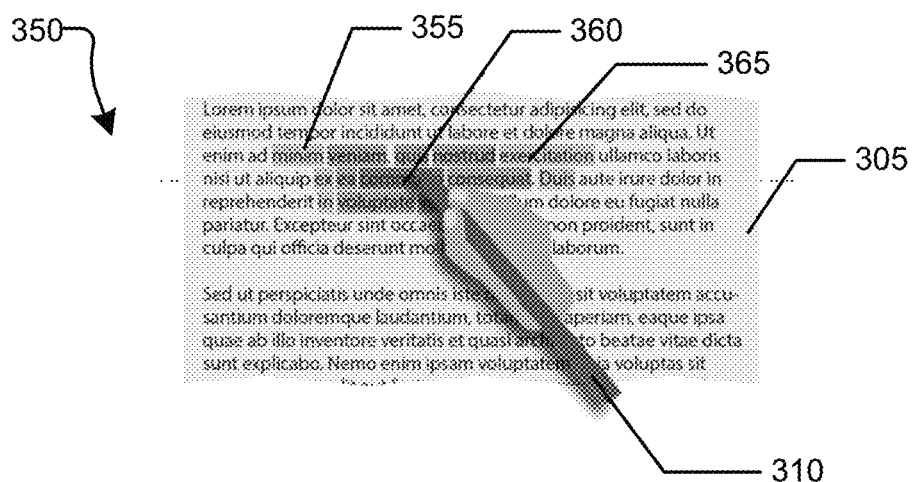

FIGS. 3A and 3B are illustrations 300 and 350 of a display of objects on a touch screen display 305, such as display 210 of FIG. 2. The illustrations include active pen 310 and word objects 315, 320, 325, 355, 360, and 365. In FIGS. 3A and 3B, pen 310 is positioned near, but not touching, touch screen display 305. Pen 310 may be said to be hovering above touch screen 305. This positioning of pen 310 may cause recognition of objects in proximity to pen 310. In addition, the objects are emphasized based upon the proximity to pen 310. In the embodiment of FIGS. 3A and 3B, the emphasis is shown by highlighting. Thus, words 320 and 360 are nearer to pen 310 than words 315, 325, and 365 and are highlighted with more intensity. As pen 310 changed its position from FIG. 3A to 3B, the words closest to the pen changed. Accordingly, in response to the motion of the men, the highlighting of the words changed. Thus, in FIG. 3A, word 320, "minim" received the most intense highlighting and words 315 and 325, "eiusmod" and "incididunt," received a less intense highlighting. In FIG. 3B, word 360, "commodo," receives the most intense highlighting. Word 355, "minim," receives a lighter highlighting, and "eiusmod" and "incididunt," which were highlighted in FIG. 3A, are not highlighted in FIG. 3B because they are not sufficiently near the tip of pen 310.

The highlighting illustrating in FIGS. 3A and 3B may be based upon the capacity to recognize the position of a user input instrument near the surface of the touch screen and to coordinate the movements of the user input instrument with the display of text or other objects on the touch screen. In some embodiments, capacitive touch input devices may offer the capability of detecting a "hovering" user input instrument, before the instrument actually physically touches the display. In other embodiments, digitizer input devices (accepting input from an active pen) also offer the capability to detect a hovering pen tip, before the pen actually physically touches the display. Other technologies for recognizing a hovering touch screen include signal generation by a touch screen, the use of cameras, and other technologies known to those of skill in the art.

The coordination of the movements of the user input instrument with the display of text or other objects on the touch screen may be achieved by identifying a controller of the words or other objects displayed on the touch screen that are nearby the tip of the user input instrument. A driver of the touch screen may then interact with the text control, translating movements of the pen into commands to the text control to highlight text. In further embodiments, the driver may utilize rich text formatting capabilities of the text control to show the per-word proximity highlights, as calculated based on the individual word's positions in relation to the pen tip. Such standardized display controllers may not be available for modifying the display of other objects, such as objects of a map. In such a case, the driver may have to utilize an application programming interface (API) or other communication method. An API may consist of a set of routines made available by an application such as a mapping application. Other programs may use the routines to request the performance of low-level tasks by the application, such as changing the display of objects generated by the application, by calling upon the routines of the API.

In some embodiments, the process of emphasizing objects near the user input instrument may begin by setting the touch screen display in an object recognition mode. In this mode, when a user input instrument is hovering near the touch screen, the touch screen emphasizes objects on display on the touch screen that are near the user input instrument. The user input instrument may be, for example, an electric pen, a finger, or other pointing instrument known to those of skill in the art for providing user input to a touch screen. In further embodiments, the mode may be set by adjusting a control on the touch screen or on the user input instrument; for example, by depressing a button on an active pen or other electric pen. Thus, when a control is used to set the touch screen to object recognition mode and the user input instrument is a finger, the user may rely on a control on the touch screen itself to set the touch screen to object recognition mode. In other embodiments, the mode may be set without adjusting a control.

In many embodiments, the process of emphasizing objects may be harnessed to simplify the targeting involved in text selection. This dynamic highlight of nearby objects may guide the user in placing the tip of a user input instrument on a desired object. The user may then touch the object on the surface of the touch screen to begin an object selection process with that object. Further, the touching of the tip or other pointing end of the user input instrument to the display surface may end the dynamic emphasis of nearby objects.

In other embodiments, objects other than words may be displayed. In many embodiments, forms of emphasis other than underlining may be used. In general, an emphasis of a word or other object may mark or distinguish a segment of text or other object from other segments of text in a body of text or other objects in a touch screen display. Methods for emphasizing may include highlighting, a segment mark, differentiated font—a larger size font; a different font; fonts with different characteristics, such as bold, italicized, or underlined; drawing a boundary, such as a rectangular boundary, around the portion of text; a blinking background, with black highlights blinking on and off; a display similar to a marquee; a rotating black or red border; a shimmer, in which text moves in and out of focus; and sparkles moving through the text or other objects. Methods for emphasizing text or other objects may also include other uses of graphical elements to point to the portion of text or other objects; and other methods of visually distinguishing a portion of text or other objects that may occur to those of skill in the art. The phrase "object selection assistance" refers to user interface features that assist a user in the selection of objects. The phrase shall include emphasizing objects near a hovering user input instrument.

Figure 4A:
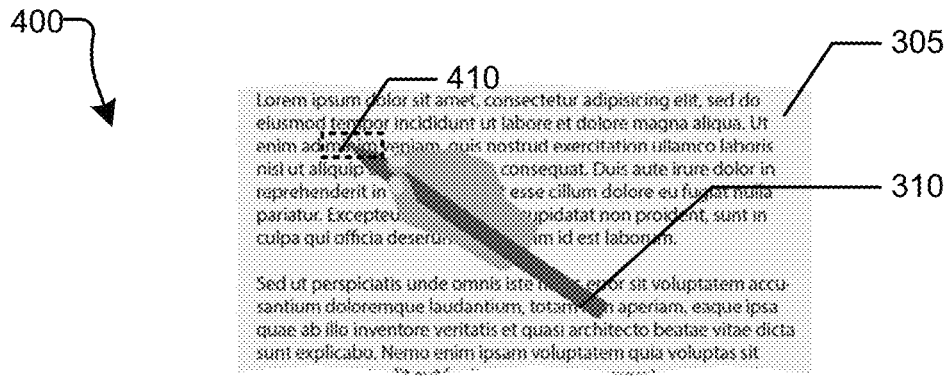
FIGS. 4A, 4B, and 4C are illustrations of text selection by an active pen on a touch screen according to an embodiment of the present disclosure.
Figure 4B:
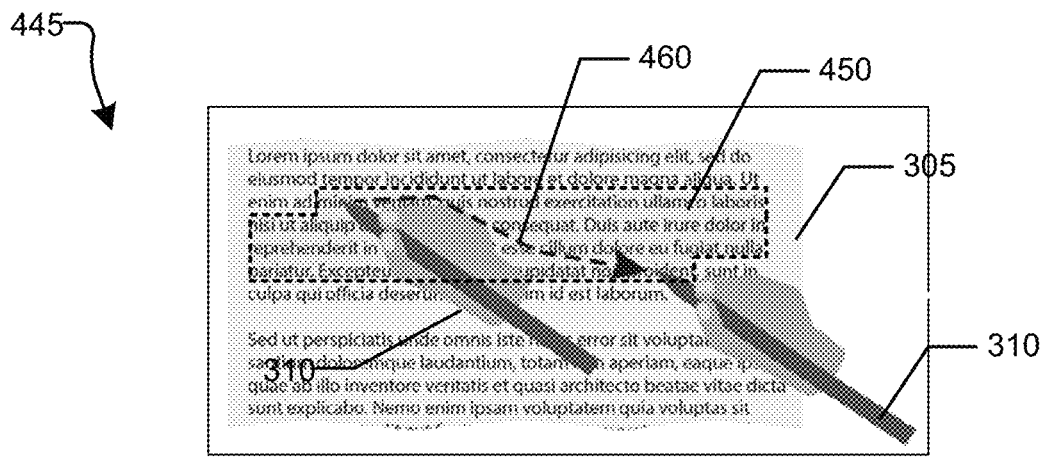
Figure 4C:
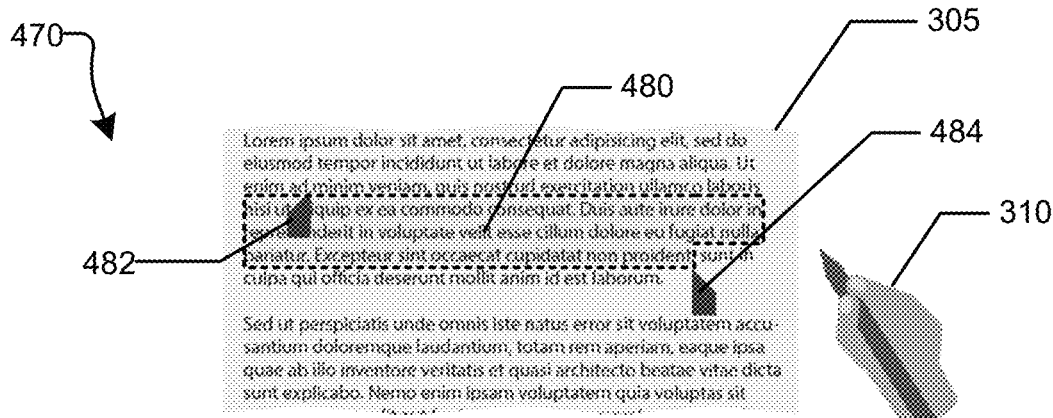

FIGS. 4A, 4B, and 4C are illustrations 400, 435, and 470 of text selection by an active pen on touch screen display 305 according to an embodiment of the present disclosure. The illustrations include active pen 310, segments of text 410, 450, and 480, path 460, and handles 482 and 484. The text selection process of FIGS. 4A, 4B, and 4C may begin by setting a mode of the touch screen display. In some embodiments, the process may be initiated by setting the touch screen in object recognition mode. Text selection may then begin by touching the touch screen with the user input instrument. In other embodiments, text selection mode may be a different mode from object recognition mode. In these embodiments, adjusting a control, such as depressing a button, may enable text-selection mode.

In FIG. 4A, the user input instrument touches the touch screen display on word 410 and that word is selected, as shown by the emphasis. In FIGS. 4A, 4B, and 4C, emphasis of a segment is indicated by dashed lines around the segment. In other embodiments, different methods of emphasis, such as highlighting, may indicate the selected text. In FIG. 4B, as the user input instrument 310 is moved along the surface of the touch screen 305 along path 460, the selection is extended to include all of the words in segment 450. The text selected is based upon the path of the user input instrument 310 along the surface of touch screen display 305. In the embodiment of FIG. 4B, the selected text includes lines from the line of initial contact to the line of current contact. The selection of words in the first line includes words from the point of initial contact to the end of the line in the direction of movement of user input instrument 310. The selection of words in the last line includes words from the beginning of the line to the point of current contact. In other embodiments, other algorithms may determine the selection of words or other objects based upon the motion of a user input instrument along a surface of a touch screen.

In FIG. 4C, the user input instrument 310 is removed from the surface of the touch screen 305. As a result, handles 482 and 484 appear to enable further manipulation of the selection. Dragging the handles may change the selected text. In further embodiments, adjusting a control on a user input instrument or a touch screen after moving the user input instrument away from the surface may confirm text selection. The user may then enter commands to take an action with respect to the text, such as copying it, printing it, or emailing it. In other embodiments, the confirmation of text selection may require fewer steps. The handles may be omitted, the lifting of the user input instrument may confirm text selection, or a confirmation button alone may confirm text selection. Embodiments of FIGS. 3A, 3B, 4A, 4B, and 4C may enable a user of a touch screen to conveniently select text. The user may pre-select text by holding a user input instrument near the touch screen and may then select the text by touching the touch screen and moving the user input instrument along the surface of the touch screen. In many cases, this method of text selection may enable a user to avoid having to work with the handles. The process of selecting based upon touch and motion may be sufficiently accurate that there is no need for further adjustment with handles. The phrase "object selection assistance" shall include the process of process of selecting objects based upon a touch of a touch screen to a surface of a touch screen and the motion of the user input instrument along the surface of the touch screen.

Figure 5:
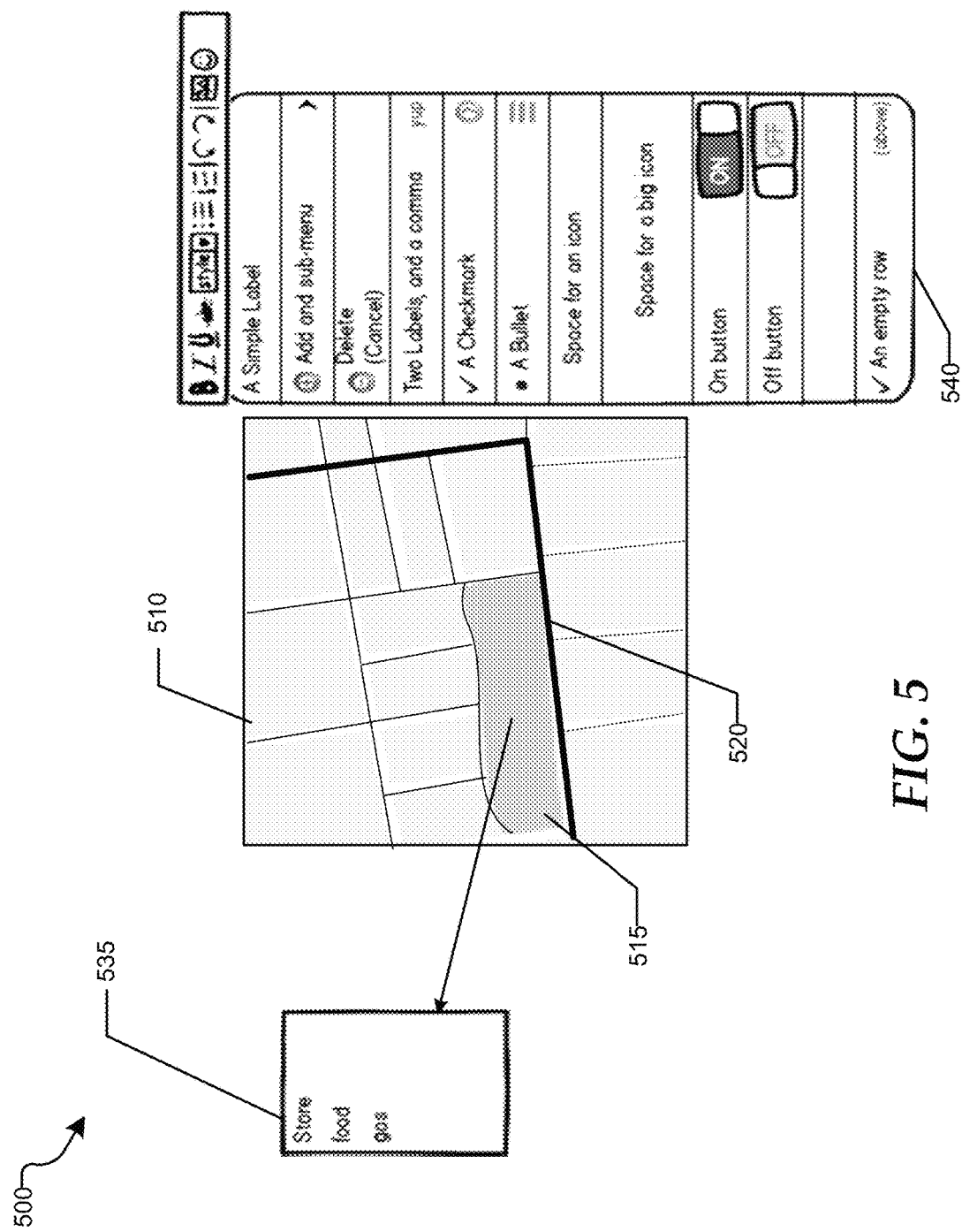
FIG. 5 is an illustration of a map display on a touch screen according to an embodiment of the present disclosure.

FIG. 5 is an illustration of a map display 500 on a touch screen according to an embodiment of the present disclosure. Display 500 includes region 510, content display 535, and menu 540. Region 510 includes mapping object 515 and path 520. These may be objects created by a mapping application. A user may, for example, have caused the mapping application to generate path 520 by physically moving a user input instrument along the path or by selecting two objects on the display and requesting that the mapping application show the user a path between the objects. In the embodiment of FIG. 5, by hovering the user input instrument near the touch screen, the user may cause the display to emphasize the display of one or more objects, such as object 515 and 520. As the user changes the position of the user input instrument but keeps it above the surface of the touch screen, the touch screen may change the objects that are emphasized. Further, when the user touches the user input instrument to the touch screen, a nearby object or objects may be selected. As the user then slides the user input instrument along the surface of the touch screen, the selection of objects may be modified based upon the motion of the user input instrument. The selection of an object may cause the touch screen to display its properties in content display 535. Thus, in FIG. 5, the area represented by object 515 provides a store, a source of food, and a gas station. When multiple objects are selected, a content display may include the properties of all of the objects. In addition, the user may control the display through the use of menu 540. By selecting icons on menu 540 with the user input instrument, the user may control how objects on the map are displayed. Thus, the user may apply labels to objects, such as "home location." In the embodiment of FIG. 5, the menu is hierarchical, as menu items may have sub-menus.

Figure 6:
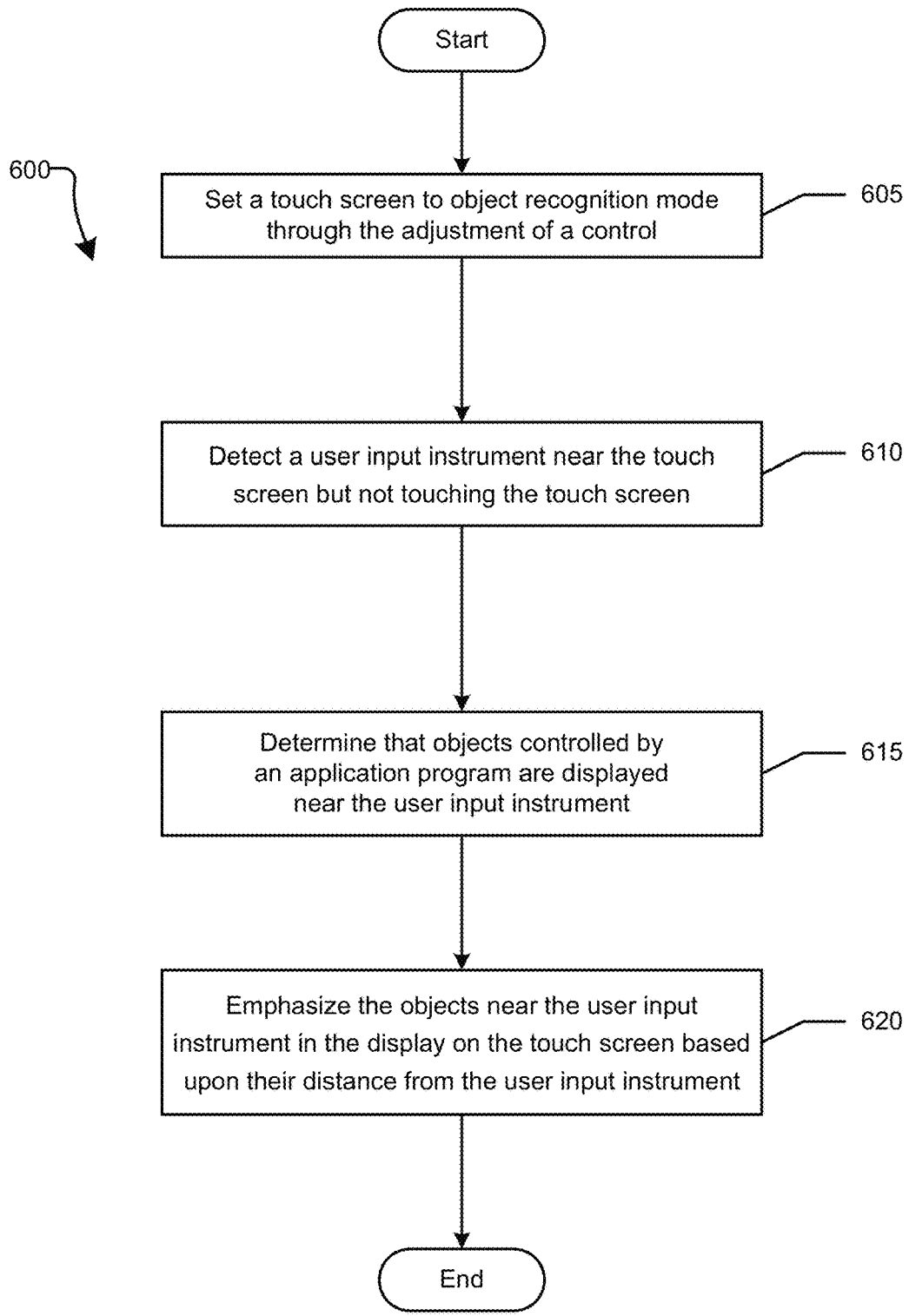
FIG. 6 is a flowchart illustrating a method of object selection assistance for emphasizing objects on a display of a touch screen according to an embodiment of the disclosure.

FIG. 6 is a flowchart of a method 600 of object selection assistance for emphasizing objects on a display of a touch screen according to an embodiment of the disclosure. The touch screen may be touch screen 205 of FIG. 2. Method 600 begins at block 605 with setting the touch screen to object recognition mode through the adjustment of a control. In object recognition mode, the touch screen may recognize objects displayed on the screen near a user input instrument and may emphasize the display of those objects. The control may lie on the touch screen or on the user input instrument. A user may, for example, click or depress a button on the touch screen or on a user input instrument to set the mode of the touch screen to object recognition mode.

At block 610, the touch screen detects a user input instrument near the touch screen, but not touching the touch screen. The user input instrument may, for example, be located slightly above the touch screen; or, more generally, located at a slight distance away from the display surface of the touch screen in a direction perpendicular to the plane of the display surface. At block 615, the touch screen determines that objects controlled by an application program are displayed near the user input instrument. The touch screen may, for example, determine that a text control controls the display of words near the tip of the user input instrument and communicate with the text control to determine the words that are displayed.

In block 620, the touch screen may emphasize the objects near the user input instrument in the display on the touch screen. The emphasis may include highlighting. In the case of text, highlighting may also include underlining and changes of font. In the case of text, the touch screen may instruct the text control to modify the display. The instructions may use generic rich text format instructions. In the case of other objects, the instructions may require use of an API for the application that generates the objects.

The emphasis of an object may be based upon the distance of the object from the tip of the user input instrument. The distance of each nearby object may be calculated, and the emphasis based upon the distance. In many embodiments, an object closer to the tip of the user input instrument may receive the same or a greater emphasis than a more distant object. In further embodiments, when the form of emphasis is highlighting, the highlight intensity applied to an object may be inversely proportional to the tip's proximity to the object, with a maximum intensity applied to an object touched by the tip. In some embodiments, method 600 may serve as a preliminary step to selection of text or other objects. This method may enable a user to determine which text or other object will be selected when the user touches the surface of the touch screen with the tip of the user input instrument.

Figure 7:
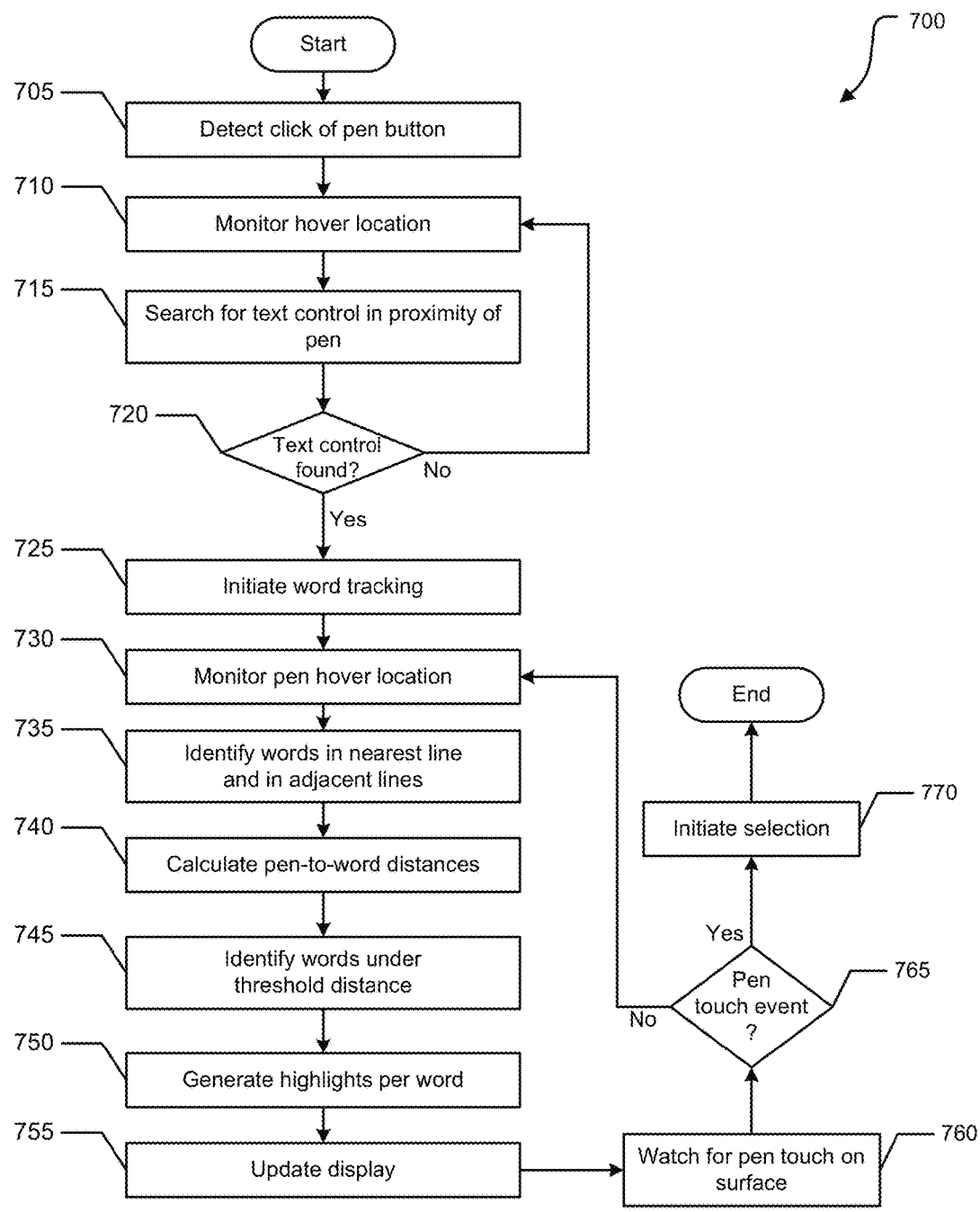
FIG. 7 is a flowchart illustrating a method of object selection assistance for emphasizing text on a display of a touch screen according to an embodiment of the disclosure.

FIG. 7 is a flowchart of a method 700 of object selection assistance for emphasizing text on a display of a touch screen according to an embodiment of the disclosure. Method 700 begins at block 705 with detecting a click of a pen button of an active pen. The click may place the touch screen in a word-recognition mode. At block 710, the touch screen monitors the location of the pen as it hovers above the touch screen. The pen may be an active pen, transmitting signals to the touch screen to enable its location; the touch screen may detect the presence of the pen in an electric field generated by the touch screen; or the touch screen may detect the pen by other hover detection technologies known to those of skill in the art.

At block 715, the touch screen searches for a text control in proximity of the pen, and at decision diamond 720, the touch screen determines whether the text control was found. If not, method 700 returns to block 710, to continue monitoring the location of the user input instrument.

If so, at block 725, the touch screen initiates word tracking. At block 730, it monitors the pen hover location and at block 735, it identifies words in the nearest line and in the lines adjacent to the nearest line. At block 740, the touch screen calculates the distance from the tip of the pen to the words and at block 745, identifies words under a threshold distance. In some embodiments, the threshold distance may be selected so that only a few words are displayed; for example, at most three larger words on each line or a number of smaller words with a similar total length. In some embodiments, the threshold distance may apply only to distances along a line, determining the number of words per line to be selected. A separate parameter may determine the number of lines to be displayed. The touch screen may, for example, only emphasize words in the line closest to the tip of the user input instrument and the lines above and below that line.

At block 750, highlights are generated of the words within the threshold distance of the pen. The highlights are generated per word. Thus, words at different distances from the pen may be highlighted with a different intensity. At block 755, the display is updated. Thus, as the user moves the user input instrument, the display may vary, enabling the user to determine that the nearest word is a word the user desires to select. At block 760, the touch screen watches for a pen touch on the surface and at decision diamond 765, the touch screen determines if the event has occurred. If so, at block 770, the touch screen may initiate text selection. If not, the touch screen returns to block 730 to continue to monitor pen hover location. In other embodiments, the pen touch event may terminate the emphasis of words based upon proximity, but may not start text selection. In alternate embodiments, the emphasis of words based upon proximity may continue even after a pen touch event.

Although FIG. 7 describes an embodiment for highlighting words near a hovering pen, other embodiments may involve different forms of objects, different user input instruments, and different methods of emphasis. Objects may also include vector objects in maps, vector objects in drawings, cells in spread sheets, and other objects created by other kinds of application programs. User input instruments may include styluses, ordinary pens and pencils, and a finger of a user.

Figure 8:
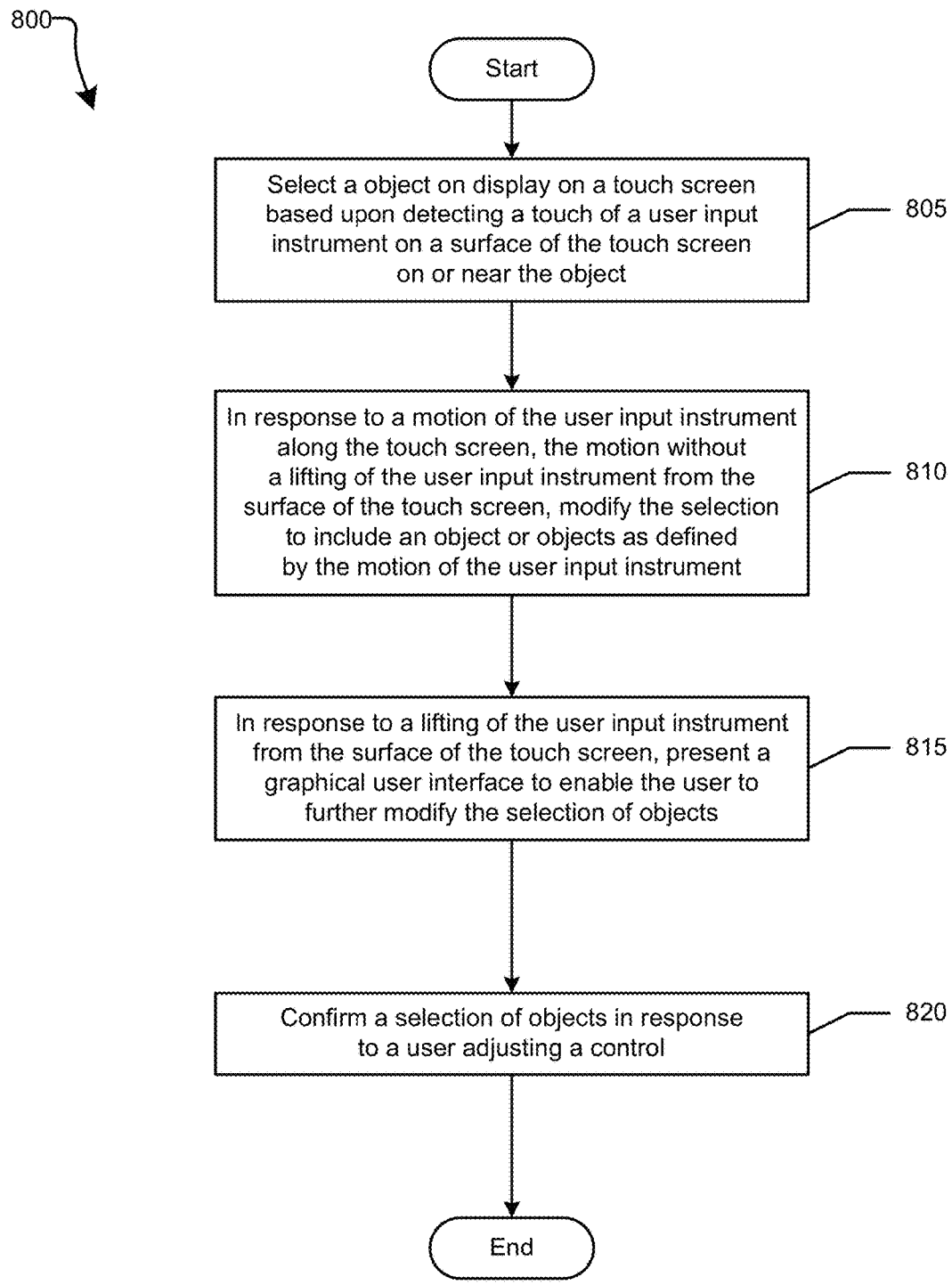
FIG. 8 is a flowchart illustrating a method of object selection assistance for selecting objects on a display of a touch screen according to an embodiment of the disclosure.

FIG. 8 is a flowchart of a method 800 of object selection assistance for selecting objects on a display of a touch screen according to an embodiment of the disclosure. The touch screen may be touch screen 205 of FIG. 2. Method 800 begins at block 805 by selecting an object on display on a touch screen based upon detecting a touch of a tip of a user input instrument on a surface of the touch screen near the object. The user input instrument may touch the display of the object. Alternatively, although the user input instrument does not touch the object, it touches near the object and at a smaller distance from the object than from any other object on display. Preliminary to the selection, the touch screen may have been placed in an object selection mode. It may, for example, have been placed in an object recognition mode pursuant to method 700 of FIG. 7, and then placed into object selection mode by moving the user input instrument to touch the surface of the touch screen.

At block 810, the selection is modified based upon the motion of the user input instrument, where the motion is along the surface of the touch screen without being lifted from the surface. The object or objects being selected are changed based upon the path of the user input instrument along the surface. As an example, as the user input instrument is moved down and to the right of the initial selection, objects between the original touch position and the current position are included. In some embodiments, such as text fields, the selection may include all objects with vertical location (on a graph, the y-coordinate) between the initial location and the current location. For objects with equal vertical location; for example, on the same line, only objects horizontally between the original touch position and the current position are included. In other embodiments, the two locations may define corners of a rectangle, and only objects within the rectangle or intersecting the rectangle are selected.

At block 815, in response to a lifting of the user input instrument from the surface of the touch screen, the user is presented a graphical user interface to enable the user to further modify the selection of objects. In the case of text, the user may be presented handles to enable the user to modify the selection of words by dragging the handles. At block 820, the selection of objects is confirmed in response to a user adjusting a control. The user may, for example, depress a button. In other embodiments, one or both of blocks 815 and 820 may be omitted. The user may not be able to modify the selection of objects once the user input instrument is lifted from the surface of the touch screen, or the modification of the selection after lifting may confirm the selection. In alternate embodiments, the user may again touch the user input instrument to the surface of the touch screen to continue to modify the current selection.

Figure 9:
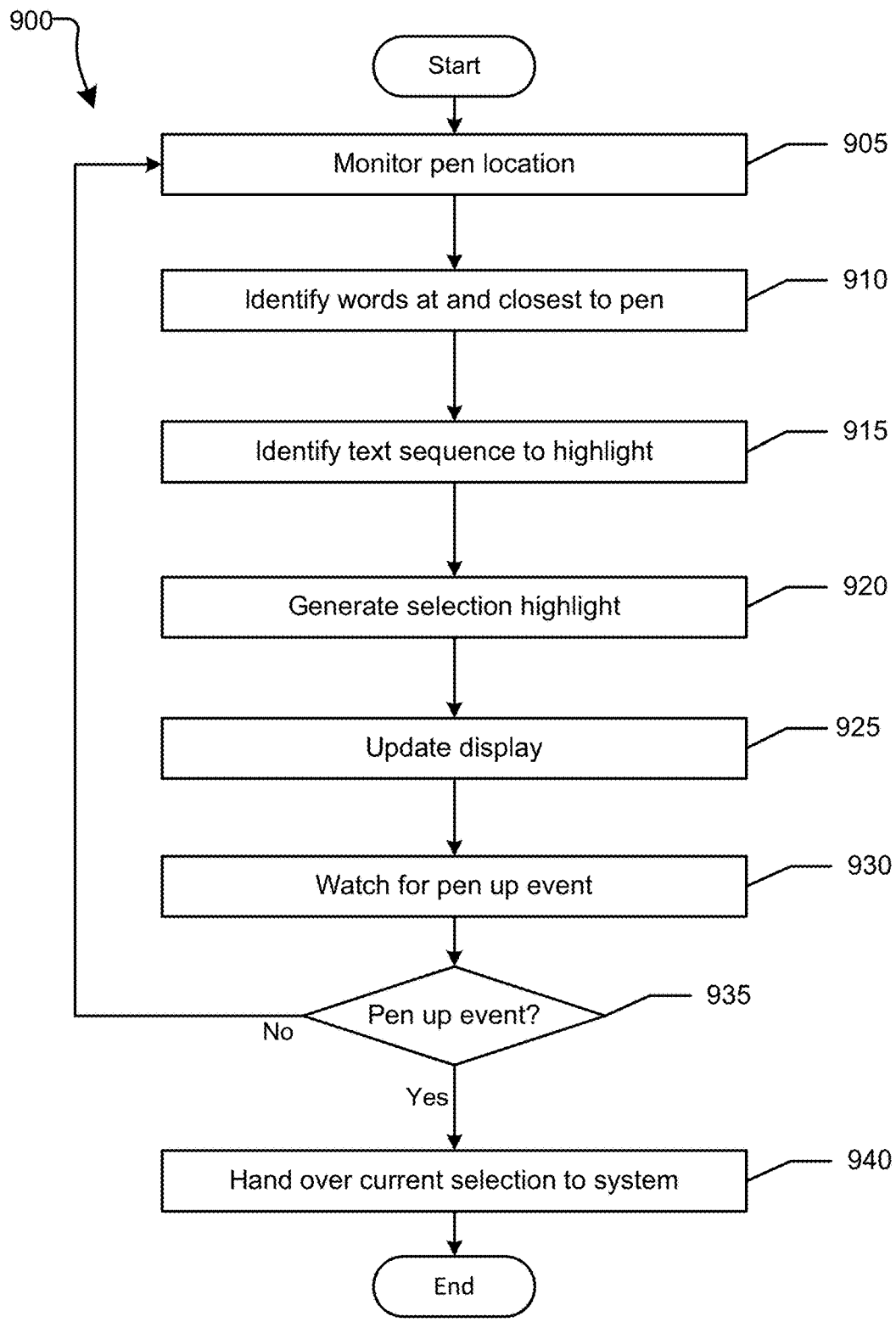
FIG. 9 is a flowchart illustrating a method of object selection assistance for selecting text on a display of a touch screen according to an embodiment of the disclosure.

FIG. 9 is a flowchart of a method 900 of object selection assistance for selecting text on a display of a touch screen according to an embodiment of the disclosure. The method may begin by setting the touch screen in text-recognition mode. In some embodiments, the touch screen is set in text recognition mode by first setting it in word recognition mode and then touching the surface of the touch screen with a pen. At block 905, the touch screen monitors the location of the pen on the surface of a touch screen, such as touch screen 205 of FIG. 2. At block 910, the touch screen identifies words at and closest to the pen. The touch screen may, for example, locate a text control in the proximity of the pen location, and communicate with the text control. At block 915, the touch screen identifies a text sequence to highlight. The text sequence may be based upon the movement of the pen along the surface of the touch screen. At block 920, the touch screen generates a highlight of the selection. The touch screen may, for example, issue a command to the text controller under an RTF protocol.

At block 925, the pen updates the display. As the motion of the pen is continued, the selection of text based upon the movement may change, and thus the text to be highlighted may change. At block 930, the touch screen watches for a pen up event, the lifting of the pen from the surface of the touch screen. At decision diamond 935, the touch screen determines if the pen up event has occurred. If the event has occurred, at block 940, the touch screen hands over the current selection of text to the system, such as an operating system, for further processing. If the event has not occurred, the touch screen returns to block 905 to continue to monitor pen hover location. In some embodiments, after a pen up event, a user may be given a further opportunity to modify the selection of text, such as by handles. In many embodiments, the user must confirm the selection of text after the pen up event before the text is handed over to the system. The user may, for example, click a button on the pen to confirm the selection.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device such as a video game controller, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed:

1. A method comprising:
   detecting, via a hover-sensing device, a user input instrument tip perpendicularly near a tip hover detection point on a touch screen but not touching the touch screen;
   determining via a processor that objects controlled by an application program are displayed near the tip hover detection point in a plane of a display and the touch screen; and
   providing a first visual feedback highlighting indication and a second visual feedback highlighting indication altering the original appearance of objects displayed in the plane of the display by an object selection assistance program, where selection of the first visual feedback highlighting indication and the second visual feedback highlighting indication is based upon a planar nearness determination of the object displayed in the plane of the display to the tip hover detection point on the display such that a first subset of the objects closer to the tip hover detection point have the first visual feedback highlighting indication and a second subset of the objects further from the tip hover detection point have the second visual feedback highlighting indication to indicate planar nearness of the first and second subsets of objects to tip hover detection point.

2. The method of claim 1, wherein the emphasizing an object comprises the first highlighting indication is used for the object based upon a planar nearness distance of the object in the plane parallel to the touch screen being below a first threshold distance from the tip hover detection point.

3. The method of claim 1, wherein:
   the user input instrument tip comprises an active pen tip; and
   the method further comprises adjusting a control on an active pen with the active pen tip, thereby setting the touch screen in an object recognition mode, wherein the touch screen provides visual feedback highlighting indications of objects having planar nearness to the tip hover detection point of the user input instrument tip when the user input instrument tip is perpendicularly near the tip hover detection point on the display and touch screen but not touching the touch screen.

4. The method of claim 1, wherein the user input instrument tip comprises a fingertip of a user.

5. The method of claim 2, wherein:
   the objects comprise words of text;
   the first highlighting indication comprises highlighting the words in one of a plurality of colors, bold emphasis, or underlining; and
   the first highlighting indication of a first subset of the words closer in the plane of the display to the tip hover detection point is a different highlighting indication from a second highlighting indication of a second subset of the words further from the tip hover detection point.

6. The method of claim 5, further comprising highlighting words within a first fixed distance of the tip hover detection point, wherein the first highlighting indication is used for highlighting a word within the first fixed distance from the tip hover detection point and the second highlighting indication is used for highlighting a word within a second fixed distance but outside the first fixed distance.

7. The method of claim 5, further comprising touching the touch screen with the user input instrument tip, thereby selecting a highlighted word nearest the touch.

8. The method of claim 7, further comprising moving the user input instrument tip across a surface of the touch screen touch without lifting the user input instrument tip from the surface, thereby selecting further words of text based upon the movement of the user input instrument tip.

9. An information handling system comprising:
   a processor to generate content for display on a touch screen, the content including objects that respond to touch input; and
   the touch screen to receive the input by detecting a user input instrument tip perpendicularly near the touch screen but not touching a surface of the touch screen, wherein:
   the processor, by executing an object selection assistance program, is to determine that one or more of the objects are displayed on the touch screen near a tip hover detection point corresponding to the tip and in a plane parallel to the touch screen; and
   the processor, by executing the object selection assistance program, is to provide a plurality of types of visual feedback highlighting the one or more of the objects displayed on the touch screen near the tip hover detection point in the plane parallel to the touchscreen, the type of visual feedback highlighting of an object based upon distance from the displayed object in the plane parallel to the touch screen to the tip hover detection point such that a first subset of the objects closer to the tip hover detection point have a first highlighting indication and a second highlighting indication is applied to a second subset of the objects further from the tip hover detection point than the distance of the first subset of objects, wherein the first and second highlighting indications are respective alterations to how the first subset of objects and the second subset of objects originally appear.

10. The information handling system of claim 9, wherein:
    the objects comprise words;
    the types of visual feedback highlighting of the objects comprises highlighting the displayed objects with colors, bold, underlining, or a type of visual designation indicating the object; and
    the visual feedback highlighting of the one or more objects based upon nearness of of the displayed object to the tip hover detection point comprises highlighting words within a first fixed lateral distance of the tip hover detection point at varied intensity levels, and wherein an intensity of highlighting of objects within the fixed lateral distance is increased based upon closeness of distance of the objects from the tip hover detection point in the plane parallel to the touch screen.

11. The information handling system of claim 9, wherein the user input instrument tip comprises a tip of an active pen or a tip of a finger of a user.

12. The information handling system of claim 9, wherein the processor, by executing the object selection assistance program, is to select an object nearest a touch of the user input instrument tip on a surface of the touch screen, the selection based upon the touch.

13. An information handling system comprising:

a processor to generate content for display on a display with a touch screen device, the content including objects that respond to input to the touch screen device; and the touch screen device to receive a hover input by detecting a user input instrument tip perpendicularly near the touch screen but not touching a surface of the touch screen, wherein:

the processor, by executing an object selection assistance program, is to determine that one or more of the objects are displayed on the display near a tip hover detection point perpendicular to the detected user input instrument in a plane parallel to the touch screen; and the processor, by executing the object selection assistance program, is to provide a plurality of types of visual feedback highlighting of a first object and a second object both displayed on the touch screen near the tip hover detection point but at different distances from the tip hover detection point, the type of visual feedback highlighting used for the first object and the second object are based upon a nearness in a plane parallel to the touch screen to the tip hover detection point at a location on the touch screen over which the user input instrument tip hovers perpendicularly such that the first object is closer to tip hover detection point and has a first highlighting indication and the second object that is further from the tip hover detection point has a second highlighting indication, wherein the first and second highlighting indications are respective alterations to how the first subset of objects and the second subset of objects originally appear.

14. The information handling system of claim 13, wherein:

the processor to provide a third visual feedback highlighting for a third object based upon distance from the tip hover detection point wherein the third visual feedback highlighting is applied to highlight the third object that is further from the tip hover detection point than the first object or the second object.

15. The information handling system of claim 13, wherein:

the objects comprise words;

the visual feedback highlighting of the objects comprises highlighting the objects with a color highlighting; and the first or second highlighting indication of the visual feedback highlighting of the first and second objects are based upon a distance from the tip hover detection point, wherein a first intensity of highlighting of a first word within the fixed distance of the tip hover detection point is a first highlighting indication and a second intensity of highlighting of a second word within the fixed lateral distance but further from the tip hover detection point is a second highlighting indication.

16. The information handling system of claim 13, wherein:

the processor to provide a plurality of types of visual feedback highlighting of the objects based upon the distance from the tip hover detection point comprises highlighting a first word closer to the tip hover detection point with a first highlighting indication that is a first color and highlighting a second word further from the tip hover detection point with a second highlighting indication that is a second color.

17. The information handling system of claim 13, wherein the user input instrument tip comprises a tip of an active pen or a fingertip of a user.

18. The information handling system of claim 13, wherein the processor, by executing the object assistance program, is to select an object nearest a touch of the user input instrument tip on a surface of the touch screen, the selection based upon the touch point.

19. The information handling system of claim 18, wherein the processor, by executing the object assistance program, is to select a plurality of objects based on movement of the user input instrument tip across a surface of the touch screen touch without lifting the user input instrument tip from the surface.

* * * * *